US010752170B1

(12) United States Patent
Hubert

(10) Patent No.: US 10,752,170 B1
(45) Date of Patent: Aug. 25, 2020

(54) DEVICE AND METHOD TO WARN VEHICLE DRIVER OR OTHERS OF OCCUPANT LEFT IN A VEHICLE

(71) Applicant: Michael Hubert, Woburn, MA (US)

(72) Inventor: Michael Hubert, Woburn, MA (US)

( * ) Notice: Subject to any disclaimer, the term of this patent is extended or adjusted under 35 U.S.C. 154(b) by 0 days.

(21) Appl. No.: 16/379,795

(22) Filed: Apr. 10, 2019

Related U.S. Application Data

(60) Provisional application No. 62/660,697, filed on Apr. 20, 2018.

(51) Int. Cl.
| *B60Q 1/00* | (2006.01) |
| *B60Q 9/00* | (2006.01) |
| *B60N 2/26* | (2006.01) |
| *G09F 21/02* | (2006.01) |
| *A41D 1/04* | (2006.01) |

(52) U.S. Cl.
CPC ............... *B60Q 9/00* (2013.01); *B60N 2/265* (2013.01); *G09F 21/02* (2013.01); *A41D 1/04* (2013.01); *G09F 21/023* (2020.05)

(58) Field of Classification Search
CPC ........... B60Q 9/00; B60N 2/265; G09F 21/02; G09F 2021/023; A41D 1/04
See application file for complete search history.

(56) References Cited

U.S. PATENT DOCUMENTS

| 5,023,981 A | * | 6/1991 | Anthony | ............ A44B 11/2511 24/579.11 |
| D432,446 S | * | 10/2000 | Santos | .............................. D11/5 |
| 7,254,841 B1 | * | 8/2007 | Nelson | ............... A41D 13/0012 2/102 |
| 8,120,499 B2 | * | 2/2012 | Ortiz | ........................ G08B 3/10 340/457.1 |
| 8,161,900 B2 | * | 4/2012 | Munson | ................. B60J 5/0493 116/28 R |
| 9,174,566 B1 | * | 11/2015 | Moore | .................... B60R 22/00 |
| 9,439,479 B1 | * | 9/2016 | Vu | ...................... A44B 11/2576 |
| 9,741,224 B1 | * | 8/2017 | Singh | ...................... H04W 4/14 |
| 9,796,303 B1 | * | 10/2017 | Schonfeld | .............. B60Q 5/005 |
| 2003/0150400 A1 | * | 8/2003 | Lobanoff | ............. A01K 27/002 119/771 |
| 2005/0056201 A1 | * | 3/2005 | Jones | ..................... A41D 13/01 116/200 |
| 2006/0176183 A1 | * | 8/2006 | Jetton | ................ G08B 21/0288 340/573.1 |
| 2007/0220793 A1 | * | 9/2007 | Mappes | .................. G09F 21/04 40/593 |

(Continued)

*Primary Examiner* — Quang Pham
(74) *Attorney, Agent, or Firm* — Stan Collier, Esq.

(57) ABSTRACT

A safety device provides a warning to drivers of a "child" left in a car seat. When a child is secured in a car seat a safety lanyard or safety garment with appropriate warning signs should be worn by the vehicle driver. When the driver reaches the destination, the driver will remove the child from the seat and place the safety device therein. In the event that the driver forgets the child in the car seat, the presence of the safety lanyard on the driver will serve to alert others of the child in the vehicle. The safety lanyard is attached to a safety insert that is inserted into the child car seat buckle that prevents the standard sliding buckle tabs from being inserted into the child car seat buckle. The safety insert must be removed prior to the child being bucked into the seat.

13 Claims, 4 Drawing Sheets

(56) References Cited

U.S. PATENT DOCUMENTS

| | | | | |
|---|---|---|---|---|
| 2009/0079557 | A1* | 3/2009 | Miner | G08B 21/0269 |
| | | | | 340/457.1 |
| 2009/0172982 | A1* | 7/2009 | Bell | B60R 11/00 |
| | | | | 40/541 |
| 2012/0074757 | A1* | 3/2012 | Banda | G09F 3/16 |
| | | | | 297/468 |
| 2014/0184404 | A1* | 7/2014 | Schoenberg | B60R 21/015 |
| | | | | 340/457 |
| 2014/0265484 | A1* | 9/2014 | Elharar | B60N 2/2806 |
| | | | | 297/232 |
| 2014/0293421 | A1* | 10/2014 | Brandes | G02B 5/12 |
| | | | | 359/552 |
| 2016/0059744 | A1* | 3/2016 | Cohen | B60N 2/2806 |
| | | | | 297/463.1 |
| 2016/0339838 | A1* | 11/2016 | Diaz | B60N 2/2866 |
| 2016/0351037 | A1* | 12/2016 | Yang | G08B 21/24 |
| 2017/0116839 | A1* | 4/2017 | Friedman | B60N 2/26 |
| 2017/0158186 | A1* | 6/2017 | Soifer | B60H 1/00742 |
| 2018/0065504 | A1* | 3/2018 | Lan | B60W 10/30 |
| 2019/0150821 | A1* | 5/2019 | Waters | A61B 5/4866 |

\* cited by examiner

US 10,752,170 B1

DEVICE AND METHOD TO WARN VEHICLE DRIVER OR OTHERS OF OCCUPANT LEFT IN A VEHICLE

CROSS REFERENCES TO RELATED APPLICATIONS

This is the regular utility application being filed that claims priority to a provisional patent application Ser. No. 62/660,697, filed Apr. 20, 2018, entitled, "Lanyard or garment worn by vehicle driver to nitify others of baby, child, or animal left in unattended vehicle", by inventor Michael Hubert. Notify was misspelled on Filing Receipt.

Reference to Federally sponsored research or development: NA

Reference to joint research agreements: NA

Reference to Sequence Listing: NA

BACKGROUND OF THE INVENTION

Field of the Invention

The present invention relates to safety devices for vehicles such as cars, and, in general, relates to safety of the persons or animals therein and, in particular, relates to devices to prevent leaving occupants in the vehicle unattended, especially during hot weather.

Description of the Prior Art

On occasion, a vehicle driver will leave a baby, child or animal unattended in a vehicle in warm or hot weather. This leads to dozens of children dying every year in the United States due to hyperthermia (heatstroke). While some of these children survive, they may suffer long term neurological problems. These events are significantly underreported, sometimes due to embarrassment or fear of legal and other consequences.

Most of these occurrences happen when a driver simply forgets that a child is in the back seat. A typical scenario occurs when one care provider is unable to drop off a child at day care. A different care provider is then charged with transporting the child, but then forgets that the child is in the car. They then proceed to work or another routine destination, and leave the child in the car. This problem is exacerbated by placing quiet or sleeping children in the back seat in a rear-facing child seat. Similar events can occur when children are forgotten in busses.

A variety of electronic devices have been devised to rectify this problem, but they have usually been found to be unsatisfactory (often due to false alarms, or failure to alarm, sometimes due to drained batteries or a variety of other reasons). These devices will also not inform strangers of the presence of an unattended baby in a vehicle who may rescue the child if so done. Examples of these devices and others are shown in the following patent and patent application publications and these are incorporated by reference: U.S. Pat. No. 9,741,224; Pub. No. US 2009/0079557; Pub. No. US 2009/0172982; Pub. No. US 2014/0184404; Pub. No. US 2016/0339838; Pub. No. US 2016/0351037; Pub. No. US 2017/0116839; Pub. No. 2017/0158186; and Pub. No. US 2018/0065504.

Accordingly, there is a need for a device for preventing and warning a driver that a person or animal is left unattended in a vehicle without the use of electronic devices.

SUMMARY OF THE INVENTION

The present invention is primarily directed at preventing children from being left in a vehicle unattended. The present invention will function on baby seats that use two shoulder straps with hook shaped tabs thereon. The term "baby seat" includes any car child seat. The hook shaped tabs are inserted into a buckle that is attached to a strap to the seat between the legs of a child therein. The buckle has a release button thereon and when pressed, both tabs will come out. The present invention will have a colored safety strap with indicia or wording thereon to indicate that a baby or child is in the vehicle. This strap is worn by a driver. When the baby is removed from the vehicle, a single safety tab attached to the safety strap is inserted into the buckle. If the driver leaves the vehicle with the child still in the seat, the safety strap will provide warnings to the driver and others also that a child may be in danger. A similar safety device can be used when an animal like a cat or dog is in the vehicle.

One object of the present invention is to provide a safety device for warning a driver that a child is in a vehicle.

It is another object of the present invention to provide a safety device that can be worn by a driver.

It is a further object of the present invention to provide a safety device that is easy to use.

It is still a further object of the present invention to provide a safety device that can function among various baby seats; and It is yet a further object of the present invention to provide a safety device that prevents the insertion of the standard seat tabs into the buckle with the safety tab therein.

These and other objects, features, and advantages of the present invention will become more readily apparent from the attached drawings and the detailed description of the preferred embodiments, which follow.

BRIEF DESCRIPTION OF THE DRAWINGS

Like reference numerals refer to like parts throughout the several views of the drawings.

DETAILED DESCRIPTION OF THE PREFERRED EMBODIMENTS

Figure 1:
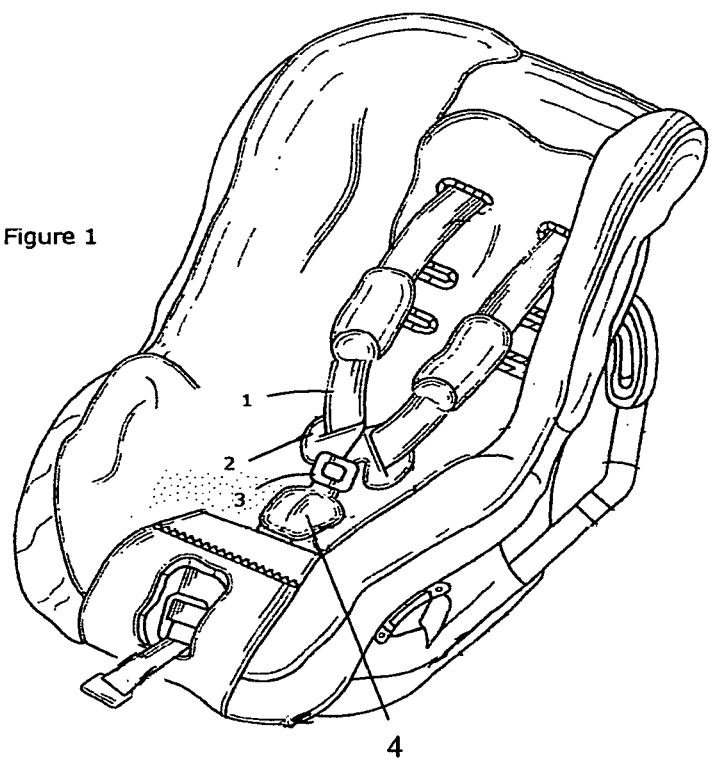
FIG. 1 is a perspective view of a typical child car seat with restraint straps showing the shoulder straps buckled as prior art.

The present invention provides a safety device for warning drivers of a "child" left in a car seat that is placed in a vehicle for use with children. The child may be a baby or an occupant wherein the occupant is a child, a baby, or an animal. When a child is secured in a car seat a safety device being a lanyard or safety garment with appropriate warning signs would be worn by the vehicle driver. When the driver reaches the destination, the driver will remove the child from the seat and place the safety device into the locking buckle. In the event that the driver forgets the child is the car seat after leaving the vehicle, the presence of the safety device on the driver will serve to alert the driver and others of the child in the vehicle. The safety device has a safety tab that is inserted into the child car seat buckle that prevents the standard sliding buckle tabs from being inserted into the child car seat buckle. The safety tab must be removed prior to the child being bucked into the seat. It should be understood that the word "child" includes "baby" and the word "vehicle" includes a car, van or bus or any vehicle having a baby seat placed therein.

Most all children that die from hyperthermia in vehicles are sitting in specialized car seats, with similar, but not identical straps and buckles. A typical car seat 10, FIG. 1, has two shoulder straps 1 with sliding metal tabs 2 that are inserted into a buckle 3 attached to a strap 4 that is between the child's knees, not shown. FIG. 2 shows the car seat 10 with the straps 1 unbuckled. For clarity, the child is not in the drawing.

Figure 2:
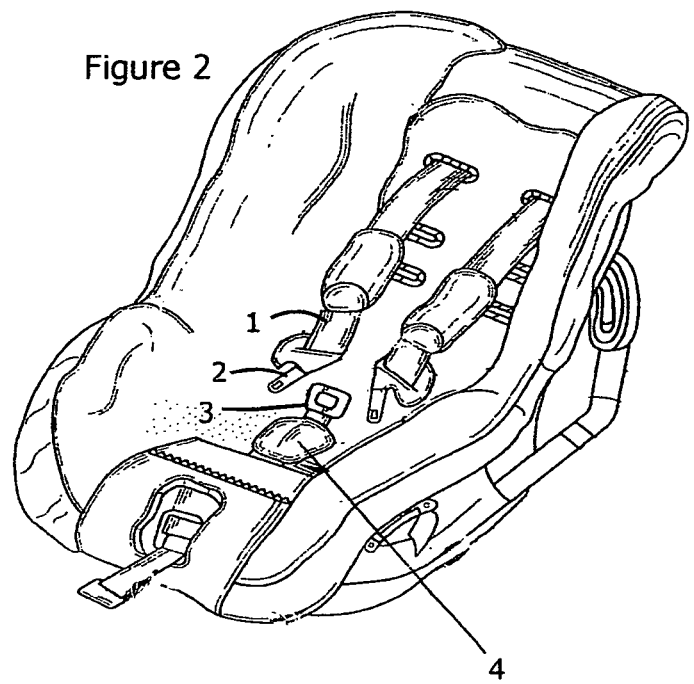
FIG. 2 is a similar view as in FIG. 1 except the shoulder straps have been unbuckled and showing exposing the standard sliding tabs that can be inserted into the buckle.

The method of the present invention includes a safety device 20 that includes a safety tab 24, similar to the tab found on child car seat straps (item 2 in FIG. 1). The tabs found on child car seats are not all identical. Many are similar, but will not work with buckles 3 found on other car seats. These tabs can vary in the length of the tab 24, the size of the hole 25 for connecting to the buckle 3 and the distance between the buckle hole 25 and the tip 26. One brand of baby seat is GRACO Contender65™, another brand is the COSCO EasyLite™, another brand is the EVENFLO Litemax35™, and another brand is the Britax DualFite™. These brands do have metal tabs and some of the brands have plastic tabs. It should be understood, that unique brand specific safety tabs can be used. Also, a universal safety tab may fit many seats.

The present invention may include a modified tab 24, or universal safety tab, that is longer, has a larger buckle hole 25, and a shorter distance between the buckle hole 25 and the tip 26, when compared to most other tabs. As a result, the modified safety tab 24 or universal tab 24 fits virtually every child car seat buckle sold in the United States.

Figure 3:
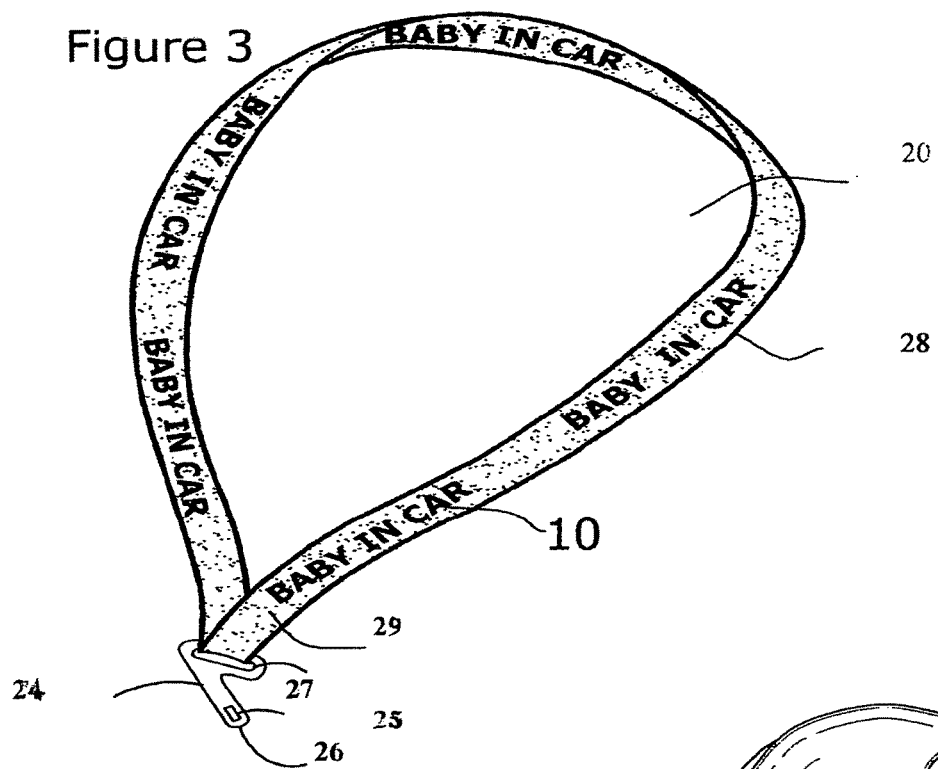
FIG. 3 is a perspective view of a safety lanyard imprinted with "BABY IN CAR" with a safety metal tab hanging from it as in the present invention.
Figure 4:
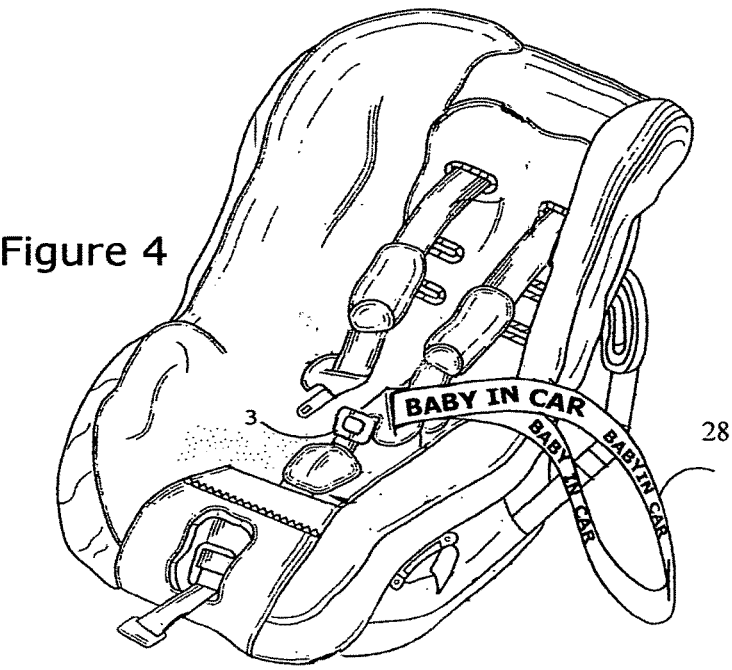
FIG. 4 is a perspective view of the baby seat of FIG. 2 and the same safety lanyard as in FIG. 3, but with the safety tab inserted into the buckle of an unoccupied child car seat of the present invention.

In FIG. 3, this modified safety tab 24 has a hole 27 attached to a brightly colored lanyard 28, made of nylon, cotton, or other woven material 29. The lanyard 28 has printed or woven text 10 that contains a warning such as "BABY IN CAR". When the child is not in the seat, the modified safety tab 24 is inserted into either slot on the child or baby seat buckle. It snaps into place, similar to the tabs of the original car seat. Since it is locked into the car seat buckle 30, it is not easily lost. When it is time to place the child into the car seat, it is impossible to lock both baby seat strap tabs 20 into the buckle 30, without first removing the modified tab 24 attached to the lanyard 28. It is simple to press the release button on the buckle 3, remove the safety tab 4, place the lanyard 28 around the driver's neck, and buckle the child into the seat as usual. The driver then wears the lanyard 28 and it should not be removed until ready to remove the child from the seat and then it is pushed into the buckle 4.

When the driver reaches the planned destination, the driver then returns to the child's car seat. Prior to removing the child, the driver removes the lanyard 28 from around the neck, and then presses the buckle 3 release button. The two standard tabs 2 are released and removed, and the safety tab 4 is then inserted into either of the two tab slots on the buckle for either left or right handed people. The child is then removed.

When worn in the vehicle, the lanyard is visible and provides tactile proof that the driver has removed the lanyard from the child car seat, and assuring the driver and others that they are taking appropriate efforts to ensure the security of the child. Should the lanyard (8) be worn away from the vehicle, it will provide the driver both a visible and tactile reminder that they have forgotten about the child in the car. What could have been a tragedy can be quickly rectified.

In the event that the driver has left the car, and is not immediately aware that they are still wearing the lanyard, they may well remember when they remove their outer garment, or see a reflection in a mirror or store window. In the unlikely event that they still do not notice the lanyard, other people, including family members, coworkers, retail employees or even strangers on the street, will notice the brightly colored lanyard with the printed warning and could inquire about the safety of the child in the car.

A less frequent event is when a driver makes a conscious decision to leave a child in a car. This sometimes occurs for a "quick errand" but sometimes longer. A driver would need to remove (and perhaps hide) the lanyard. This extra step might give some drivers pause to reconsider this decision and not leave the child in the car unattended. If they were to proceed and leave the child in the car, after removing or hiding the lanyard, they could not claim that they forgot. They might face a stiffer penalty or repercussions for actively hiding the fact that they decided to leave a child in a car. This is an additional deterrent to this practice.

This method is for the notification by the use of the lanyard or garment, even if the safety tab is not utilized (as in the event of an unusual car seat mechanism, or an animal in a vehicle). If the child car seat has an unusual buckle, a simple carabiner can be substituted for the metal tab that is hanging from the lanyard. As an alternative, a snap-ring could be used. This carabiner could be attached to the baby car seat restraint strap, or the snap ring snapped into the hole on the car seat standard metal tab, instead of inserting into a buckle.

Figure 5:
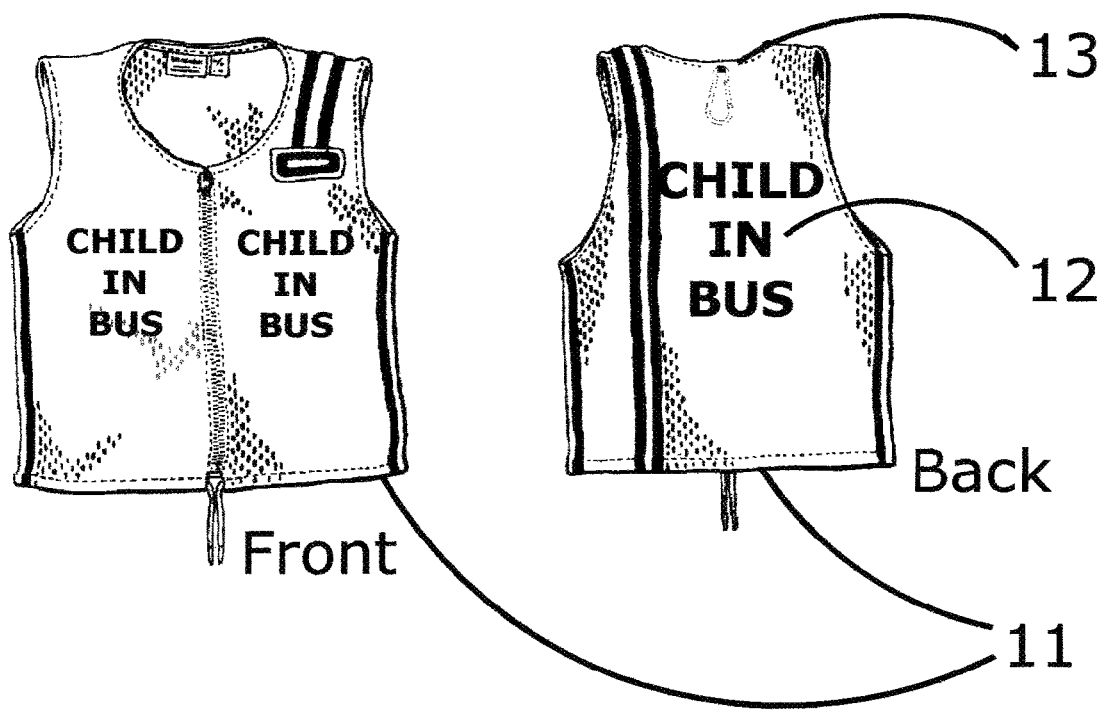
FIG. 5 shows in perspective view an adult safety vest imprinted with "CHILD IN BUS", with a small carabineer attached to rear collar as another embodiment of the present invention.
Figure 6:
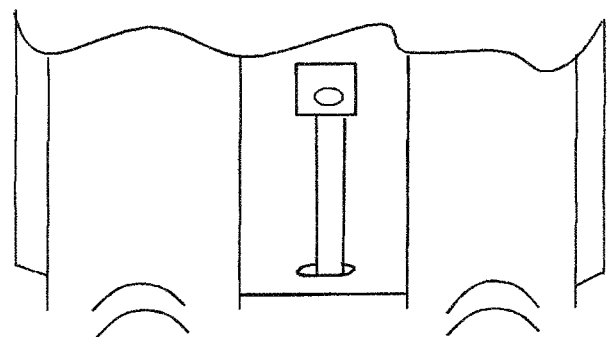
FIG. 6 shows a partial view of a child legs with the strap to the buckle.

This invention can also be utilized on school buses. A driver can leave a child on a bus in a strange bus yard. Sometimes a child falls asleep on the way to school. The driver brings most of the children to school, but then returns home or runs errands, before returning to school at the end of the day. The child can wake up anywhere, without the driver in sight. There may not be child seats utilized (with associated buckles and tabs) in a bus, but a vest (FIG. 5, item 11), worn by the driver, may display the words "CHILD IN BUS" 12 or similar phase. Such a vest 11 is only to be worn while children are on the bus. Before leaving the bus, the driver can walk to the rear of the bus, checking for children along the way, and hang the vest on a snap at the rear wall of the bus. A plastic snap, carabineer, loop or ring or similar device can sewn to the top back of the vest 13. In smaller vehicles, used often as school buses, a snap on the vest could be attached to the seat belt, steering wheel, or hung near the windshield, obstructing view, and requiring the driver to remove and wear the vest when transporting children. Similar to the lanyard described earlier, the vest will remind the driver of children on the bus, and notify others in a similar manner.

If this invention is used to remind the driver of an animal in a car, a similar invention can be used. The lanyard would be equipped with a simple carabiner or snap-ring (often seen at the end a leash) instead of the metal tab on the lanyard. When the animal is not in the car, the carabiner or snap ring would be snapped into a handy metal ring or cord mounted to the car interior. When the animal is placed in the vehicle, the driver would remove the lanyard hanging from the ring or cord and wear it. After the driver drives to the destination, the lanyard is removed from the driver's neck and snapped in the ring or cord hanging inside of the vehicle. The animal is then removed.

In greater detail, the safety device 10 is for preventing a child from being left unattended in a car or a vehicle, that child being seated in a conventional baby seat, and removably secured therein by a pair of shoulder straps having tabs thereon that are removably secured to a central buckle with a release button thereon that is secured to the baby seat by a buckle strap. The safety device is comprised of an attachment device for removably wearing said safety device on a driver of a vehicle having the child therein or even attached to the vehicle itself; an indicia means on said attachment device for warning that the occupant or child is in the vehicle; and a safety insert or tab being attached to said attachment device, said safety insert being removably inserted into the central buckle. The attachment device is selected from the group comprising a carabiner, a flexible cord capable of being placed about an arm of the driver, and a spring clip capable of being removably attached to clothing of the driver. The indicia means may include one or more brightly colored materials where the color is selected from the group consisting of red, orange, yellow, green, and blue or one or more words or symbols thereon indicating that a child or baby is in the car or vehicle. It may be desirable for the manufacturer of the baby seat to include a brand specific safety device with each baby seat, but a safety device may have the safety insert capable of working with two or more baby seats of different brands. The safety insert may be composed of metal or plastic or a combination of both. More specifically, the safety insert is shaped like a number seven with an insertable leg having an aperture for a locking lever in the buckle, the locking lever holding the safety device therein when pushed therein, and the release button allowing the removal of the safety insert, and a plastic handle about the other leg may be included for better grip. The handle is opposite the insertable leg, and the handle has a slot or hole so that it may be readily attached to a lanyard, garment, hook or snap.

Figure 7:
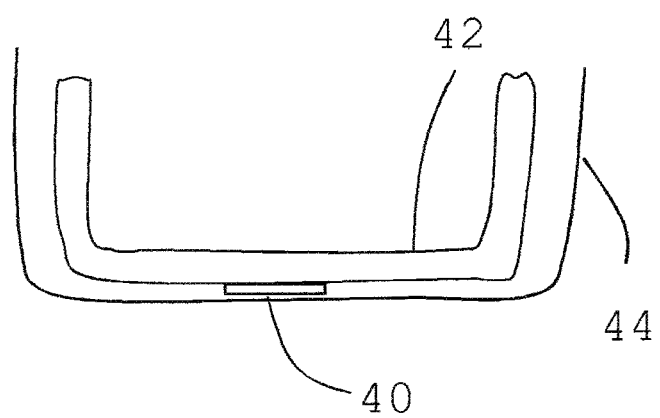
FIG. 7 shows a sensor under a seat cushion in the baby seat.

With today's electronics, the safety device may further include a warning means to alert the driver if the safety device is removed from the vehicle and the child is left inside of the car or vehicle. This may be a sensor in the baby seat, see FIG. 7, that looks for body heat, body pressure, etc. This sensor will be wireless and the warning means may be a smartphone that alerts the driver or the car horn may be activated to alert people around the vehicle.

The present invention as noted above may be carried out by a method for preventing a child from being left unattended in a vehicle, that child being seated in a conventional baby seat, and removably secured therein by a pair of shoulder straps having tabs thereon that are removably secured to a central buckle with a release button thereon that is secured to the baby seat by a buckle strap, the method comprising the steps of: obtaining a safety device for use in the baby seat in the car or vehicle; placing the safety device into the buckle of the empty baby seat; removing the safety device before securing the child in the baby seat; placing the safety device on the driver; driving to desired location, removing the baby seat belts, securing the safety device in the baby seat and removing the baby from the vehicle.

The present invention protects the child when the driver removes the safety device from the baby seat and places the safety device on the driver with the child in the baby seat; leaves the vehicle with the child in the baby seat; and is warned that the child is still in the car by someone seeing the safety device on the driver so the driver returns to the vehicle to rescue the child.

The invention also provides for the situation where there is no baby seat by obtaining the safety device by the driver from the vehicle; wearing of the safety device by the driver; securing a garment to the driver by a plastic snap, carabineer, loop or other device that will allow the device to be secured in the vehicle when not transporting children; insuring that any child therein is removed from the vehicle; leaving the vehicle with the child therein; returning to the vehicle with the child; insuring that the child leaves the vehicle; and returning the garment to the vehicle after insuring that no children are in the vehicle. The vehicle may be a van or a bus having multiple seats therein. When the child is no longer in the vehicle, the lanyard can be secured to the driver's seat belt, steering wheel or other location, after the child has left the bus, but prior to the driver leaving the bus. The child may be replaced with an animal wherein the animal is a dog or a cat or a bird.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A safety device for preventing a child from being left unattended in a car or a vehicle, that child being seated in a conventional baby seat, and removably secured therein by a pair of shoulder straps having tabs thereon that are removably secured to a central buckle with a release button thereon that is secured to the baby seat by a buckle strap, said safety device comprising:
    an attachment device for a driver of a vehicle having the child therein;
    an indicia means on said attachment device for warning that the child is in the vehicle; and
    a safety insert, said safety insert being attached to said attachment device, said safety insert being removably inserted into the central buckle of said baby seat when the child is not in the baby seat, wherein said safety insert is able to work with two or more baby seats.

2. The safety device as defined in claim 1, wherein said attachment device is selected from the group comprising a lanyard capable of being placed about the driver's neck, a flexible cord capable of being placed about an arm of the driver, and a spring clip capable of being removably attached to clothing of the driver.

3. The safety device as defined in claim 2, further including one or more words or symbols thereon indicating that a child or baby is in the car or vehicle.

4. The safety device as defined in claim 1, wherein said indicia means includes one or more brightly colored materials.

5. The safety device as defined in claim 4, wherein said colors can be selected from the group consisting of red, orange, yellow, green, and blue.

6. The safety device as defined in claim 1, wherein the baby seat includes said safety device when sold.

7. The safety device as defined in claim 1, wherein said safety insert is composed of metal or plastic or a combination of both.

8. The safety device as defined in claim 7, wherein said safety insert is shaped like a number seven, an insertable leg having an aperture for a locking lever in the buckle, said locking lever holding said safety device therein when pushed therein, and said release button allowing the removal of said safety insert.

9. The safety device as defined in claim 8, further including a handle being opposite the insertable leg, and said handle having a slot or hole so that it may be readily attached to a lanyard, garment, hook or snap.

10. The safety device as defined in claim 1, further including a warning means to alert the driver if the safety device is removed from the baby seat and left inside of the car or vehicle.

11. The safety device as defined in claim 10, wherein said warning means is selected from the group as follows: an audible alert is sent to a smart phone of the driver, and the car or vehicle horn is activated.

12. A method for preventing a child from being left unattended in a vehicle, that child being seated in a conventional baby seat, and removably secured therein by a pair of shoulder straps having tabs thereon that are removably secured to a central buckle with a release button thereon that is secured to the baby seat by a buckle strap, said method comprising the steps of:
  obtaining a safety device for use in the baby seat in the car or vehicle;
  placing the safety device into the buckle of the empty baby seat;
  removing the safety device before placing the child in the baby seat;
  placing the safety device on the driver;
  driving to desired destination;
  driver is reminded of baby in car due to wearing the lanyard;
  driver unbuckles baby;
  inserts safety device into baby seat buckle; and
  removes the child from the baby seat.

13. The method as defined in claim 12, wherein the further steps are: the driver removes the safety device from the baby seat and places the safety device on the driver with the child in the baby seat; leaves the vehicle with the child in the baby seat; warned that the child is still in the car by someone seeing the safety device on the driver; returns to the vehicle to rescue the child.

* * * * *